(12) United States Patent
Joensuu

(10) Patent No.: US 7,714,738 B2
(45) Date of Patent: May 11, 2010

(54) METHOD AND ARRANGEMENT FOR DETERMINING ROTATIONAL MOVEMENT

(75) Inventor: Heikki Joensuu, Helsinki (FI)

(73) Assignee: ABB Oy, Helsinki (FI)

( * ) Notice: Subject to any disclaimer, the term of this patent is extended or adjusted under 35 U.S.C. 154(b) by 327 days.

(21) Appl. No.: 11/952,378

(22) Filed: Dec. 7, 2007

(65) Prior Publication Data

US 2008/0150742 A1      Jun. 26, 2008

(30) Foreign Application Priority Data

Dec. 22, 2006     (FI) ................................ 20065844

(51) Int. Cl.
*G08B 21/00* (2006.01)
(52) U.S. Cl. .................. 340/671; 340/672; 324/160
(58) Field of Classification Search ............. 340/671, 340/672, 572.1, 686.1, 686.3, 669; 324/166, 324/207.25, 207.23, 207.26, 160; 701/93; 73/514.16, 117.3, 488
See application file for complete search history.

(56) References Cited

U.S. PATENT DOCUMENTS

| 4,999,579 | A | * | 3/1991 | Winfried ..................... 324/166 |
| 5,459,397 | A | | 10/1995 | Spillman, Jr. |
| 6,173,213 | B1 | * | 1/2001 | Amiguet et al. ............. 700/230 |
| 7,324,887 | B2 | * | 1/2008 | Kawasaki et al. ............. 701/93 |
| 7,436,737 | B2 | * | 10/2008 | Fukuda et al. ................ 368/28 |
| 2003/0020604 | A1 | | 1/2003 | Fischer et al. |
| 2004/0066290 | A1 | | 4/2004 | Hernando et al. |

FOREIGN PATENT DOCUMENTS

| DE | 100 49 019 A1 | 5/2002 |
| JP | 9-189708 A | 7/1997 |
| JP | 2006-195798 A | 7/2006 |
| WO | WO 01/12453 A1 | 2/2001 |

OTHER PUBLICATIONS

Finnish Search Report (with English language translation of category of cited documents) dated Oct. 24, 2007.
Finnish Office Action dated Apr. 24, 2008.

* cited by examiner

*Primary Examiner*—Toan N Pham
(74) *Attorney, Agent, or Firm*—Buchanan Ingersoll & Rooney PC

(57) ABSTRACT

A method and arrangement for detecting rotational movement. The method comprises the steps of arranging a sensor at the end of a rotation axle of a rotating object and at a distance from the rotation axle, arranging a detector external to the end of the rotation axle of the rotating object in such a manner that the distance between the sensor and detector changes as the object turns around its rotation axle, transmitting an poll to from the detector to the sensor, receiving the poll at the sensor, and in response to receiving the poll, transmitting a reply from the sensor to the detector, determining the power used in signaling, and detecting rotational movement on the basis of the change in signaling power.

20 Claims, 1 Drawing Sheet

METHOD AND ARRANGEMENT FOR DETERMINING ROTATIONAL MOVEMENT

BACKGROUND OF THE INVENTION

The invention relates to the determination of the rotational movement of an object and especially to a preferable way of providing duplication of speed measurement related to machine safety.

Conventional non-contacting speed measurements are based on inductive, capacitive, magnetic, or light-employing solutions in which a detector, in other words a short-distance proximity switch, is typically set very close to the axle of a rotating object, and the passing of a counterpart or counterparts fastened to the cylindrical surface of the axle can be accurately detected as detector pulses. This counterpart can be characterized as a passive part of the system. In this type of speed measurement, a typical pulse frequency is one pulse per axle rotation, in which case the measurement is called a sparse pulse measurement. Due to the nature of the sparse pulse measurement, it is not very accurate, and there are delays in the measurement when the speed changes.

The purpose of such a measurement of rotational movement is to provide information on the actual rotational movement and not so much an accurate measuring result of the exact speed of the rotation that could be used as feedback information for speed control, for instance. The task of the conventional sparse pulse measurement is typically to produce a second measuring result related to machine safety. In certain operating conditions, two independent measurements of the rotational speed are often required, and these relate to the operation of safety equipment, for instance.

For the duplication of the measurement, it is unnecessary to implement both duplicate measurements with exact and often high-cost detectors, when the second measurement is only used to detect the rotational movement.

Contacting tachometers and pulse detectors are generally used for performing accurate measurements. In addition, a magnetized or other non-contacting code ring can be fixed to the axle. The use of such a device corresponds to said contacting solutions in view of its relatively high costs and difficulty of installation.

To achieve machine safety and duplicate measurements, it is thus necessary to produce a reliable measuring method that is simple to install and inexpensive and reliable.

BRIEF DESCRIPTION OF THE INVENTION

It is thus an object of the invention to develop a method and an apparatus implementing the method in such a manner that the above problems are solved. The object of the invention is achieved by a method and arrangement that are characterized by what is stated in the independent claims. Preferred embodiments of the invention are disclosed in the dependent claims.

The invention is based on the idea that to a rotating object, typically at the end of its axle, a sensor is placed to reply to the polls made by a detector placed external to the axle end. On the basis of the power of these polls, it is possible to determine the location of the sensor relative to the detector, whereby the rotational movement is indicated as a variation of speed. The combination of a sensor and detector is preferably of RFID type used in identifying objects by placing a sensor with an identifier in the object and reading the information in the identifier by the detector.

An advantage of the method and arrangement of the invention is the considerable simplicity of the installation of the required equipment. The installation does not require any exact alignments or measurements. The mechanical placement of the detector and sensor is not critical to the operation of the arrangement and method. In the arrangement, it is also possible to use sensors of different sizes without needing any special fitting.

The devices used in the invention can be made very environmentally tolerant, because the devices are not dependent on bearings or other wearing mechanical parts. This is a significant advantage in industrial use, for instance, where the conditions are often difficult for measuring devices.

The apparatus of the invention is immune to vibration and corresponding disturbances of the objects being measured. Vibrations may be caused by the vibrations of the axles and transmission of a roll being measured, for instance. The equipment is also simple to service, because it is enough to clean it when a general cleaning is done.

The detector of the arrangement can be placed in conditions easier than those of the axle being measured, in other words, behind a plexiglass, for instance.

The cabling of the arrangement of the invention to the system controller only requires two couples, one for auxiliary power supply and one for signaling.

BRIEF DESCRIPTION OF THE FIGURES

The invention will now be described in greater detail by means of preferred embodiments and with reference to the attached drawings, in which.

DETAILED DESCRIPTION OF THE INVENTION

Figure 1:
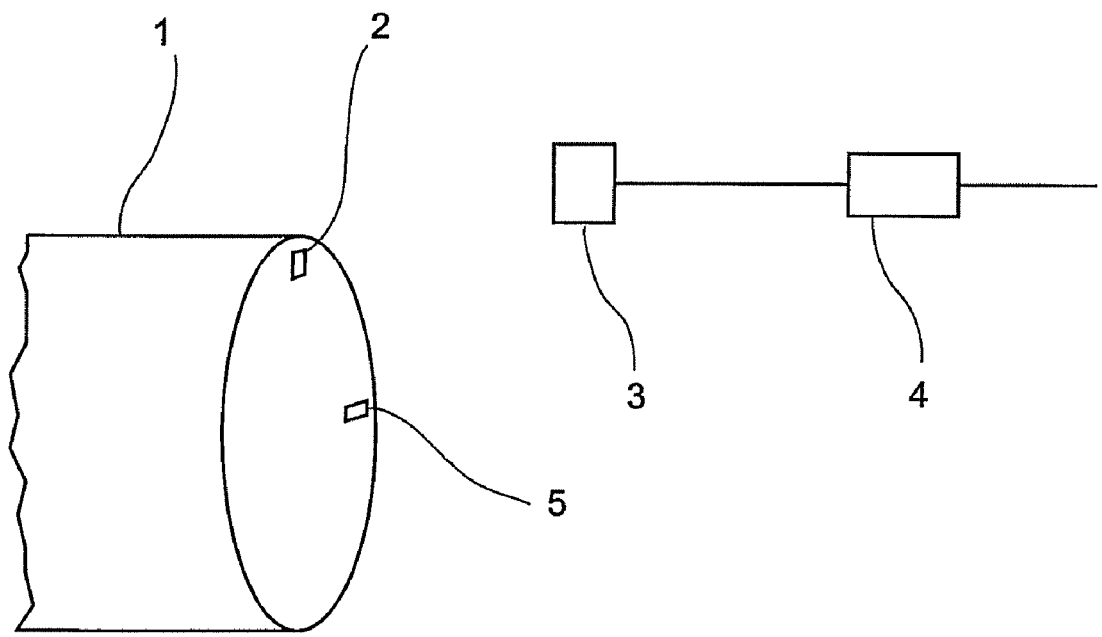
FIG. 1 shows a general view of the arrangement of the invention.

FIG. 1 shows a general view of the configuration of the arrangement of the invention. In the arrangement, a sensor 2 is placed at the end of an axle 1. A detector 3 is in turn fixed in place in such a manner that it is external to the axle end and the axle envelope surface. The sensor is positioned in a rotating object, such as the end of a roll axle, in such a manner that when the object rotates, the distance between the sensor and detector varies with the position angle of the object. The sensor 2 is further installed in such a manner that it can read the detector 3. The detector is connected over a signaling connection to a system controller 4 and the system controller is further connected over a signaling connection to a process controller or corresponding higher-level system.

The detector and sensor used in the invention are parts of an RFID (Radio Frequency Identification) system and operate in such a manner that the detector is active and transmits a poll on a system frequency. The sensor receives the poll and obtains from the poll the energy it needs for its own transmission, and replies to the poll over radio path in a predefined manner. In known applications related to object identification, an RFID sensor transmits its unique identification code to a detector in response to a poll from the detector.

According to the method of the invention, rotational movement is determined on the basis of the transmit power between a detector and sensor. In the method and arrangement of the invention, the point of interest is not so much the information transmitted by the sensor, but the transmit power of either the detector or sensor, from which the rotational movement is determined according to the invention.

In an embodiment of the method of the invention, the detector transmits at regular timely intervals a poll, and the transmit power of the detector 3 is adjusted in such a manner that it is only just sufficient for the sensor 2 to receive the poll of the detector. As the sensor replies to the poll, the transmit power of the next poll is decreased by a preset amount, for instance a step of 3 dB. If no reply is received from the sensor to the poll of the detector, the transmit power is in turn increased by a preset amount, for instance a step of 1 dB. When continuing operation in the manner described above by decreasing and increasing the transmit power depending on the sensor reply or non-reply, a cyclic sine wave curve is obtained of the power graph of the periodically transmitted poll, and the frequency of the curve corresponds to the frequency of the rotating object, and the curve thus indicates the rotation of the object.

The transmit power is adjusted according to the embodiment in response to whether a reply is received to the poll sent by the detector. The amount of the required transmit power is approximately proportional to the square of the distance. The lowest transmit power possible to establish a connection is then at its lowest when the sensor on the axle is closest to the detector. Similarly, when the distance between the detector and sensor is at its longest, the lowest transmit power possible to establish a connection is then also at its highest.

According to a second embodiment of the method of the invention, the detector 3 transmits polls at regular intervals using a constant power. The sensor 2 receives the poll and transmits its reply to the detector 3. In this embodiment the power received by the detector is determined to detect and determine rotational movement. In the above manner there is a square-law relationship between the power and distance, whereby the power received by the detector changes as the distance between the detector and sensor changes as a result of the rotational movement. By measuring the received power, a sine wave curve is thus obtained with one cycle corresponding to one rotation of the rotating object.

In one embodiment of the arrangement of the invention, the controller 4 adjusts the transmit power of the detector 3 in the above manner and collects information on whether a reply was received for the transmitted poll. The system controller determines from the collected power information the rotational speed and transmits this to a higher control level. In addition to the rotational speed, it is also possible to define dependent derived quantities, such as angular acceleration, operating speed, or rotational angle. Said derived quantities can also be defined in the system controller 4, whereby the system controller transmits calculated values to the higher level.

The embodiment of the system and method in which the lowest possible transmit power is searched for, also works in connection with even relative electromagnetic disturbances. The system is also immune to dirt, since dirt is typically transparent to electromagnetic radiation. It is clear that some space for adjustment needs to be left for varying conditions for the purpose of increasing the signal levels.

Because the signaling is digital, the decision level is always clear. The understanding of polls and replies ends when the signal-to-noise ratio of the reply is lower than approximately 15 dB. The power transmitted to the counterpart is at least 6 dB higher than this, i.e. the signal-to-noise ratio of the poll is at least 22 dB.

The rotational speed, or angular velocity, is calculated on the basis of the obtained power curve in such a manner that the rotational angle obtained directly from the power curve is divided by the lapsed rotation time. In other words, the cycle of the obtained power curve is studied for instance from the smallest value of the used power to the next smallest value, when the rotating object has turned one rotation. The time lapsed during this cycle is thus the time of one rotation, and the angular velocity can easily be calculated. Instead of an entire rotation, it is also possible to define the time from the peak of the minimum transmit power to its smallest value, when the object has turned half a rotation. The resolutions of angular and speed measurements depend on the frequency of the polls, update interval, and power resolution.

A second embodiment of the invention determines the amount of the power received by the detector, and the system controller calculates from the obtained power curve the rotational speed and possible derived quantities in the above manner. According to the invention it is also possible that the system controller only calculates the rotational speed, and the derived quantities are calculated at a higher level.

When using the invention, with a suitable selection of the bit rate, transmit frequency, i.e. the frequency of the carrier, and the poll frequency, it is possible to affect the time resolution and the maximum speed being measured. In any case, the invention provides a better angular resolution than the traditional sparse pulse methods.

According to an embodiment of the arrangement of the invention, two sensors 2, 5 are positioned in a rotating object. The use of two sensors also makes it possible to find out the rotation direction of the rotating object. The relative locations of these two sensors need not be defined exactly. A suitable angular difference between the sensors is for instance approximately 60 to 90 degrees with respect to the rotation axle. The rotation direction can be determined, since each sensor only replies its own polls. The power curves related to each sensor then have a time difference that corresponds to the phase angle difference of the sensors. The rotation direction can be detected from the order of the peaks of the sine power curves, for instance. An embodiment of such an arrangement and method provides the advantage that this can be implemented with just one detector.

Figure 2:
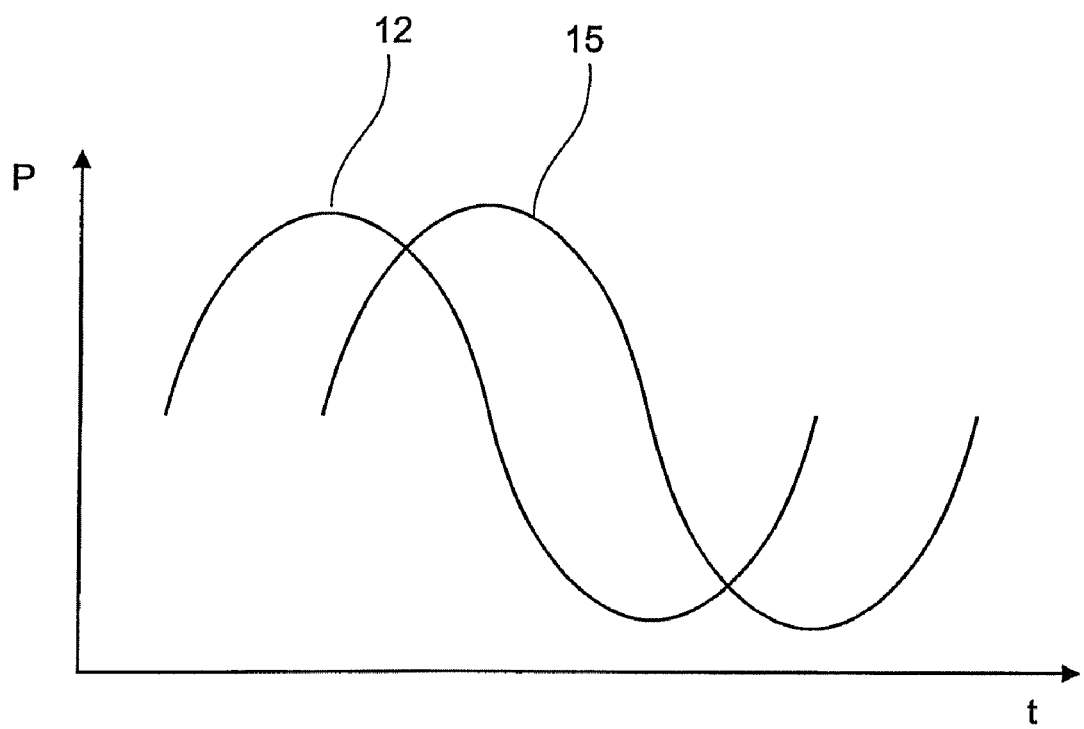
FIG. 2 shows a general view of power curves to be obtained.

FIG. 2 shows a general view of power curves 12, 15 obtained with the invention. These power curves have been obtained while using two sensors 2, 5. The figure shows that the rotation direction of the rotating object is such that the sensor providing power curve 12 hits the closest point to the detector before the sensor providing power curve 15. The curves of FIG. 2 do not contain the discretion typical of the arrangement and method, but the curves are formed into continuous examples. However, it is clear what type of curves formed of discrete points the invention produces. The time interval between the discrete points of these power curves obtained with the invention is constant when using a constant poll frequency.

Above, the invention is described with reference to the components of an RFID system in particular. However, the invention can also be implemented with other corresponding techniques in which the energy of the poll is utilized in the transmission of the reply.

The rotating object whose rotation can be determined with the invention may be almost arbitrary. The rotating object may be a reel or roll with a rotation axle radius of at least approximately 5 cm.

It is apparent to a person skilled in the art that, as technology advances, the basic idea of the invention may be implemented in many different ways. The invention and its embodiments are thus not restricted to the examples described above, but may vary within the scope of the claims.

The invention claimed is:

1. A method for detecting rotational movement, comprising the steps of arranging at an end of a rotation axle of a rotating object and at a distance from the rotation axle a sensor, arranging external to the end of the rotation axle of the rotating object a detector in such a manner that the distance between the sensor and detector changes as the object rotates around its rotation axle, transmitting a poll from the detector to the sensor, receiving the poll with the sensor and in response to receiving the poll transmitting a reply from the sensor to the detector, determining a signaling power, and detecting rotational movement on the basis of a change in the signaling power, wherein the method also comprises steps in which the detector transmits the poll at regular intervals and a transmit power of the poll transmitted by the detector is changed in response to the reply transmitted by the sensor in such a manner that if a reply is received from the sensor, the transmit power of the next poll is decreased, and if the reply is not received from the sensor, the transmit power of the next poll is increased, in which case the power being determined is the transmit power of the detector.

2. The method as claimed in claim 1, wherein the transmit power is decreased in response to receiving a reply from the sensor more than the transmit power is increased in response to not receiving the reply, preferably the transmit power is decreased by steps of 3 dB and increased by steps of 1 dB.

3. The method as claimed in claim 2, wherein the method also comprises a step of determining on the basis of the determined power the rotation speed of the rotating object, while the determined power changes as a function of the position angle of the rotating object.

4. The method as claimed in claim 2, wherein the rotating object has two sensors arranged thereto and the sensors' polls take place using codes that differ from each other, whereby the detector is arranged to transmit the polls alternately to the sensors to determine two different powers used in signaling, and the rotation direction of the rotating object is determined from the two powers.

5. The method as claimed in claim 2, wherein the sensor is a passive component that receives energy from the poll transmitted by the detector, and the sensor and detector are specifically RFID components.

6. The method as claimed in claim 1, wherein the method also comprises a step of determining on the basis of the determined power the rotation speed of the rotating object, while the determined power changes as a function of the position angle of the rotating object.

7. The method as claimed in claim 6, wherein the rotating object has two sensors arranged thereto and the sensors' polls take place using codes that differ from each other, whereby the detector is arranged to transmit the polls alternately to the sensors to determine two different powers used in signaling, and the rotation direction of the rotating object is determined from the two powers.

8. The method as claimed in claim 6, wherein the sensor is a passive component that receives energy from the poll transmitted by the detector, and the sensor and detector are specifically RFID components.

9. The method as claimed in claim 1, wherein the rotating object has two sensors arranged thereto and the sensors' polls take place using codes that differ from each other, whereby the detector is arranged to transmit the polls alternately to the sensors to determine two different powers used in signaling, and the rotation direction of the rotating object is determined from the two powers.

10. The method as claimed in claim 1, wherein the sensor is a passive component that receives energy from the poll transmitted by the detector, and the sensor and detector are specifically RFID components.

11. A method as claimed in claim 9, wherein the sensor is a passive component that receives energy from the poll transmitted by the detector, and the sensor and detector are specifically RFID components.

12. An arrangement for detecting rotational movement, comprising a sensor arranged at an end of a rotation axle of a rotating object and at a distance from the rotation axle, a detector arranged external to the end of the rotation axle of the rotating object in such a manner that the distance between the sensor and detector changes as the object turns around its rotation axle, whereby the detector is arranged to transmit a poll to the sensor, the sensor is arranged to receive the poll and in response to receiving the poll, the sensor is arranged to transmit a reply to the detector, and the arrangement also comprises means for determining a signaling power, and means for detecting rotational movement on a basis of a change in the signaling power, wherein the detector is arranged to transmit the poll at regular intervals, and the power of the poll transmitted by the detector is arranged to be adjustable in such a manner that when the detector receives a reply, the power of the next poll is decreased, and if the detector does not receive a reply, the power of the next poll is increased, whereby the used signaling power being determined in the arrangement is the power used by the detector in polling.

13. The arrangement as claimed in claim 12, wherein the transmit power of the detector is decreased in response to receiving the reply more than it is increased in response not receiving the reply, preferably the transmit power is decreased by steps of 3 dB and increased by steps of 1 dB.

14. An arrangement as claimed in claim 13, wherein the arrangement also comprises a system controller that has a signaling connection with the detector and is arranged to determine on the basis of the power used in signaling the rotation speed of the rotating object, while the determined power changes as a function of the position angle of the rotating object.

15. An arrangement as claimed in claim 13, wherein two sensors are arranged to the rotating object and the sensors are positioned at an angle to each other with respect to the rotation axle, whereby the detector is arranged to transmit polls alternately to the sensors with unique identification codes, and the arrangement determines two powers used in signaling to determine the rotation direction of the rotating object.

16. An arrangement as claimed in claim 13, wherein the sensor is a passive component that receives energy for its transmission from the poll transmitted by the detector, whereby the sensor and detector are specifically RFID components.

17. The arrangement as claimed in claim 12, wherein the arrangement also comprises a system controller that has a signaling connection with the detector and is arranged to determine on the basis of the power used in signaling the rotation speed of the rotating object, while the determined power changes as a function of the position angle of the rotating object.

18. An arrangement as claimed in claim 17, wherein two sensors are arranged to the rotating object and the sensors are positioned at an angle to each other with respect to the rotation axle, whereby the detector is arranged to transmit polls alternately to the sensors with unique identification codes, and the arrangement determines two powers used in signaling to determine the rotation direction of the rotating object.

19. The arrangement as claimed in claim 12, wherein two sensors are arranged to the rotating object and the sensors are positioned at an angle to each other with respect to the rotation axle, whereby the detector is arranged to transmit polls alternately to the sensors with unique identification codes, and the arrangement determines two powers used in signaling to determine the rotation direction of the rotating object.

20. The arrangement as claimed in claim 12, wherein the sensor is a passive component that receives energy for its transmission from the poll transmitted by the detector, whereby the sensor and detector are specifically RFID components.

* * * * *